W. T. DURHAM.
COUPLING LINK.
APPLICATION FILED APR. 23, 1914.
1,124,877.
Patented Jan. 12, 1915.
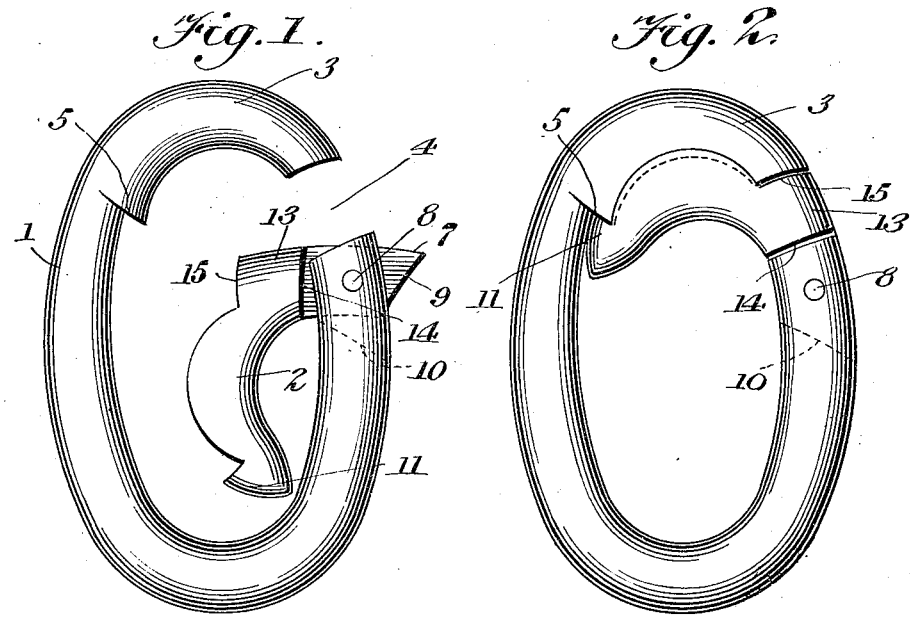
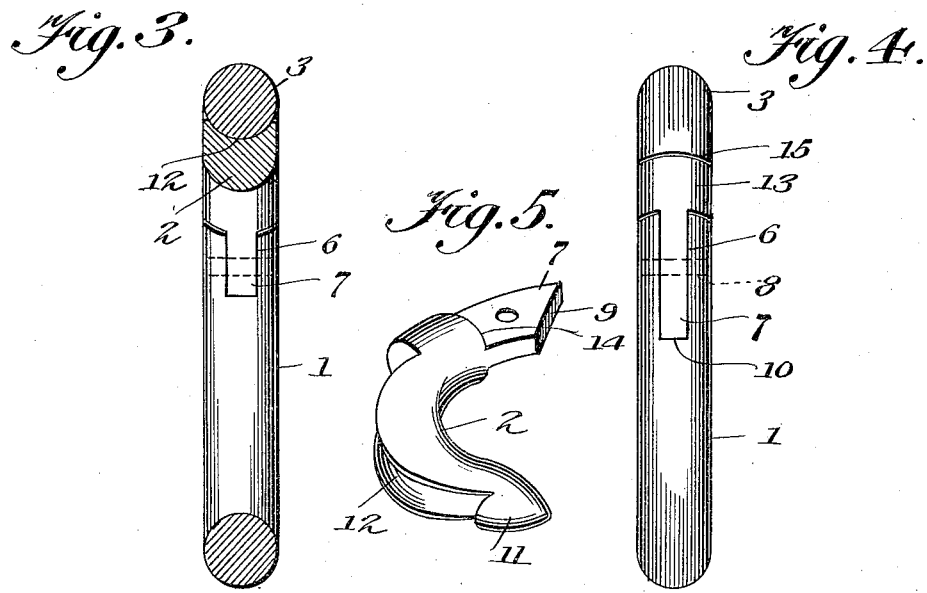
Witnesses:
H. Ackman Jr.
Frederick R. Moran
Inventor:
W. T. Durham,
By C. C. Hines
Attorney
THE NORRIS PETERS CO., PHOTO-LITHO., WASHINGTON, D. C.

UNITED STATES PATENT OFFICE.

WILLIAM T. DURHAM, OF RIDGE SPRING, SOUTH CAROLINA.

COUPLING-LINK.

1,124,877.      Specification of Letters Patent.      Patented Jan. 12, 1915.

Application filed April 23, 1914. Serial No. 834,023.

*To all whom it may concern:*

Be it known that I, WILLIAM T. DURHAM, a citizen of the United States, residing at Ridge Spring, in the county of Saluda and State of South Carolina, have invented new and useful Improvements in Coupling-Links, of which the following is a specification.

My invention relates to coupling links designed in general for the various uses for which coupling or lap links are commonly employed, the primary object of the invention being to provide a coupling link which, while simple of construction, is of maximum strength and durability, and is adapted to be used without liability of the movable member casually opening and permitting separation of the coupled members.

A further object of the invention is to provide a coupling link in which the movable closure member presents a maximum amount of surface for wear and is adapted to interlock with the body member in such a way as to effectively withstand the strains imposed thereon, while relieving the pivot member from such strains, thus avoiding the well known objections to coupling and lap links of the types in general use.

A still further object of the invention is to provide a coupling or lock link in which any tendency of the movable closure member to bind or hang is avoided, allowing said member to be easily opened and closed by hand manipulation for the connection and disconnection of the link in a ready and convenient manner.

The invention consists of the features of construction, combination and arrangement of parts hereinafter described and claimed, reference being had to the accompanying drawings, and in which:

Figure 1 is a side elevation of a lock link embodying my invention, showing the movable closure member in open position; Fig. 2 is a similar view of the link showing the movable closure member in closed position; Fig. 3 is a vertical longitudinal section through the link as illustrated in Fig. 2; Fig. 4 is an edge view of the link as illustrated in Fig. 2; and Fig. 5 is a perspective view of the movable closure member detached.

In carrying my invention into practice, I provide a link preferably of elliptical or oval form, and comprising a body 1 and a movable closure member 2. The body 1 is provided at one side, adjacent the end 3 thereof, with a passageway 4 formed by cutting away a portion of such side of the link. This passage-way permits the link to be coupled with or uncoupled from another link or other element to be engaged, as will be readily understood. The end 3 of the link body is enlarged or widened at the point where it joins the closed side of the link body, whereby a locking lug or projection 5 extending into the link is produced, which lug is preferably provided with an engaging face inclined obliquely to the major axis of the link and disposed approximately opposite the passage-way 4. The side of the link having the passage-way formed therein is bifurcated at its end portion to form a slot 6 receiving a reduced portion or shank 7 upon one end of the segmentally shaped movable closure member 2, the said member being pivotally mounted within the slot upon a transverse pin or rivet 8, whereby it is adapted to swing to the open and closed position shown in Figs. 1 and 2.

The body of the movable member 2 is shaped to conform to the curvature of the inner face of the end surface 3 which is eccentric to the axis of the link, and the inner or extreme end portion 9 of its shank 7 is beveled or inclined at an angle for engagement with the correspondingly inclined inner end wall 10 of the slot, so that when the movable closure member is closed the pivoted end thereof will be firmly braced by the inclined engaging surfaces. The free end of the movable closure member is provided with a hook 11 to engage the locking shoulder, offset or lug 5, whereby any tendency to displacement of the movable closure member in a direction circumferentially of the link is avoided and the free end of the closure member firmly braced. The body of the closure member is substantially coextensive in diameter with the diameter of the end portion 3, thus giving a large amount of wearing surface, and the outer face of said closure member is provided with a partially circular groove 12 formed by longitudinally extending flanges, which groove receives the inner portion of the end 3 when the closure member is in closed position, thereby holding and bracing the closure member against any possibility of lateral displacement and avoiding strain upon the pivotal connection and portions of the link on opposite sides of the passage-way or division 4.

In the use of the link it will be understood that the closure member 2 is swung open to the position shown in Fig. 1, allowing the link of a chain or other element to which the link is to be coupled to enter through the slot or passage-way 4, whereupon the closure member is moved to the closed position shown in Fig. 2, in which it is engaged by the retained ring or link, thus locking said closure member in closed position. As the closure member extends diametrically across the lock link it will be apparent that under the pressure of the retained link it will be prevented from casually opening at all times, while the double thickness of material which it gives with the end portion 3 insures great strength of the link at the point on which the strain falls, thus preventing the link from being bent or twisted out of shape. The portion 13 of the movable closure member between the member 2 and the tang 7 is of a size to fully close the passage-way 4 and is provided with abutment shoulders 14 and 15 to engage the walls of the passage-way by which a continuous link is produced when the closure member is in closed position. Furthermore, the engagement of the grooved side of the closure member with the end portion 3 allows the closure member to have a certain degree of inward movement without moving to open position, such as occurs when the engaged link or ring is slackened, thereby giving manifest security of connection.

It will be evident from the foregoing description that my invention provides a coupling or link in which the movable closure member is held locked in closed position by the pressure of the engaged link or ring, and that owing to the construction described a link is produced which is superior in strength and durability to ordinary lap links, and which therefore is not liable to be bent or broken under strain. Furthermore, it will be evident that a link is produced in which the movable closure member is not liable to hang or bind, so that the link may be coupled and uncoupled at all times with ease and facility.

Having thus described my invention, I claim:

1. A coupling or lock link comprising a body having one of its sides divided to form a passage-way adjacent to one end thereof, such end of the link being eccentrically curved to produce an inwardly extending locking member, and a closure member pivoted to such side of the link and adapted to close against the inner face of such end of the link and having a locking element at its free end to engage said locking projection.

2. A coupling or lock link comprising a body cut away at one side to provide a passage-way adjacent an end thereof, such end of the link being eccentrically curved to provide an inwardly extending locking projection adjacent the closed side of the link, and a movable closure member pivotally connected at one end with the first named side of the link and having a locking hook at its other end to engage said locking projection, said movable closure member being adapted to close against the inner face of the aforesaid end of the link and having a curved outer surface for interengagement therewith.

In testimony whereof I affix my signature in presence of two witnesses.

WILLIAM T. DURHAM.

Witnesses:
J. C. WATSON,
L. N. WATSON.